(12) United States Patent
Diemer et al.

(10) Patent No.: US 9,470,231 B2
(45) Date of Patent: Oct. 18, 2016

(54) ELECTRICALLY ASSISTED TURBOCHARGER

(71) Applicant: BorgWarner Inc., Auburn Hills, MI (US)

(72) Inventors: Paul Diemer, Arden, NC (US); Augustine Cavagnaro, Flat Rock, NC (US); Michael Bucking, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 91 days.

(21) Appl. No.: 14/368,893

(22) PCT Filed: Dec. 21, 2012

(86) PCT No.: PCT/US2012/071160
§ 371 (c)(1),
(2) Date: Jun. 26, 2014

(87) PCT Pub. No.: WO2013/103546
PCT Pub. Date: Jul. 11, 2013

(65) Prior Publication Data
US 2014/0373532 A1 Dec. 25, 2014

Related U.S. Application Data

(60) Provisional application No. 61/583,918, filed on Jan. 6, 2012.

(51) Int. Cl.
*F02B 33/44* (2006.01)
*F04D 13/06* (2006.01)
(Continued)

(52) U.S. Cl.
CPC ............. *F04D 13/06* (2013.01); *F01D 15/10* (2013.01); *F02B 37/10* (2013.01); *F02B 39/10* (2013.01); *F02B 39/14* (2013.01); *F05D 2220/40* (2013.01); *Y02T 10/144* (2013.01)

(58) Field of Classification Search
CPC ...... F02B 39/005; F02B 39/10; F01D 15/10; F01D 25/12; F01D 15/125; F01D 25/16; F01D 25/162; F04D 13/06

USPC .................................. 60/607–608, 605.3
See application file for complete search history.

(56) References Cited

U.S. PATENT DOCUMENTS 4,253,031 A * 2/1981 Frister ..................... F01D 15/10
60/607
4,392,752 A * 7/1983 Shimizu .................. F01D 11/00
384/135

(Continued)

FOREIGN PATENT DOCUMENTS

CN 1912364 A 2/2007
CN 101506489 A 8/2009

(Continued)

OTHER PUBLICATIONS

Chinese Patent Application No. 201280062642.3, Office Action, 17 pages, Nov. 3, 2015.

(Continued)

*Primary Examiner* — Nicholas J Weiss
*Assistant Examiner* — Ngoc T Nguyen
(74) *Attorney, Agent, or Firm* — Perkins Coie LLP

(57) ABSTRACT

An electrically assisted turbocharger (1) comprising a housing (3) and an electric motor stator (22) disposed in the housing (3). The stator (22) includes a pair of o-rings, or other circumferential seals (204, 208), disposed therearound. The o-rings (204, 208) are operative to seal against an interior of the housing (3) to form an annular chamber (130) around at least a portion of the stator (22) and a pair of end cavities (122, 126) at the axial ends of the stator (22). The annular chamber (130) is adapted to allow the circulation of a cooling fluid around the stator (22). A pair of bearings (10, 12) may be disposed in the housing (3), one on each side of the stator (22). A shaft (7) is supported in the housing (3) by the bearings (10, 12). The shaft (7) in turn supports a turbine wheel (5) and a compressor wheel. An electric motor rotor (24) is disposed on the shaft (7) between the bearings (10, 12) and inside the stator (22).

13 Claims, 3 Drawing Sheets

(51) Int. Cl.
*F02B 39/10* (2006.01)
*F02B 37/10* (2006.01)
*F02B 39/14* (2006.01)
*F01D 15/10* (2006.01)

(56) References Cited

U.S. PATENT DOCUMENTS

| | | | |
|---|---|---|---|
| 5,605,045 A * | 2/1997 | Halimi | F01D 15/10 60/607 |
| 5,904,471 A | 5/1999 | Woollenweber et al. | |
| 6,449,950 B1 * | 9/2002 | Allen | F02B 39/10 60/607 |
| 6,845,617 B1 * | 1/2005 | Allen | F01D 15/10 60/607 |
| 7,360,361 B2 * | 4/2008 | Prusinski | F02B 39/10 60/608 |
| 7,469,689 B1 | 12/2008 | Jones et al. | |
| 2002/0076336 A1 | 6/2002 | Mruk et al. | |
| 2004/0200215 A1 | 10/2004 | Woollenweber et al. | |
| 2005/0082941 A1 * | 4/2005 | Iida | H02K 1/28 417/423.1 |
| 2006/0225419 A1 | 10/2006 | Prusinski et al. | |
| 2010/0175377 A1 | 7/2010 | Hippen et al. | |
| 2010/0247343 A1 * | 9/2010 | Shimizu | F01D 25/12 417/410.1 |
| 2010/0284824 A1 * | 11/2010 | Hippen | F02B 39/10 417/44.1 |
| 2011/0103948 A1 | 5/2011 | Kuzi et al. | |
| 2014/0373532 A1 * | 12/2014 | Diemer | F02B 39/10 60/607 |
| 2015/0285263 A1 * | 10/2015 | Bucking | F01D 25/12 415/116 |

FOREIGN PATENT DOCUMENTS

| | | |
|---|---|---|
| CN | 104145099 A | 11/2014 |
| EP | 1273765 B1 | 9/2009 |
| JP | 2000-130176 A | 5/2000 |
| JP | 2000-145468 A | 5/2000 |
| JP | 2005-120927 A | 5/2005 |
| JP | 2009-13966 A | 1/2009 |
| JP | 2009013966 A * | 1/2009 |
| WO | WO 2010/081123 A1 | 7/2010 |

OTHER PUBLICATIONS

Chinese Patent Application No. 201380007628.8, Office Action, 20 pages, Dec. 9, 2015.
International Application No. PCT/US2012/071160, International Search Report & Written Opinion, 9 pages, Apr. 26, 2013.
International Application No. PCT/US2013/025518, International Search Report & Written Opinion, 11 pages, Jun. 2, 2013.
International Application No. PCT/US2013/025542, International Search Report & Written Opinion, 11 pages, May 30, 2013.
International Application No. PCT/US2013/038993, International Search Report & Written Opinion, 11 pages, Sep. 27, 2013.

* cited by examiner

ELECTRICALLY ASSISTED TURBOCHARGER

BACKGROUND

Today's internal combustion engines must meet ever stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest in this case.

A turbocharger uses exhaust gas energy, which would normally be wasted, to drive a turbine. The turbine is mounted to a shaft that in turn drives a compressor. The turbine converts the heat and kinetic energy of the exhaust into rotational power that drives the compressor. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

When a turbocharger is sized to provide maximum power output for a particular engine, the turbocharger's low-load and transient response performance is generally less than optimal. A turbocharger's compressor performance is dependent on the compressor speed. In order for the compressor to rotate fast enough to provide significant compression, or boost, to the engine, there must be a corresponding increase in exhaust gas flow. However, there is a time delay while the exhaust gases build up and the inertia of the turbine and compressor wheel assembly is overcome. This time delay between the engine's demand for boost and the actual increase in manifold pressure is often referred to as turbo lag.

To help overcome the problems of turbo lag and low-load performance, electrically-assisted turbochargers have been developed. Electrically-assisted turbochargers include an electric motor that is operative to supplement the rotational power derived from the exhaust during low-load and transient conditions. Typically, the motor is connected to the same shaft that carries the turbine and compressor wheels. In some cases, the motor's rotor magnets are carried directly on the shaft, while the stator is contained within the turbocharger's center housing.

Electric motors are sensitive to heat and contamination. Accordingly, controlling heat and oil migration, which are common issues associated with turbochargers, becomes more problematic in electrically-assisted turbocharger applications. For example, excessive heat may overheat stator coils and may damage permanent magnets. Moreover, oil contamination can create viscous drag between the motor's rotor and stator as well as transport dirt and debris into the gap between the rotor and stator.

Accordingly, there is a need for an electrically-assisted turbocharger design that inhibits oil migration into the motor and provides adequate cooling of the motor components.

SUMMARY

Provided herein is an electrically assisted turbocharger comprising a housing and an electric motor stator disposed in the housing. The stator includes a pair of o-rings, or other circumferential seals, disposed therearound. The o-rings are operative to seal against an interior of the housing to form an annular chamber around at least a portion of the stator and a pair of end cavities at the axial ends of the stator. The annular chamber is adapted to allow the circulation of a cooling fluid around the stator.

In certain aspects of the technology described herein, a pair of bearings may be disposed in the housing, one on each side of the stator. A shaft is supported in the housing by the bearings. The shaft in turn supports a turbine wheel and a compressor wheel. An electric motor rotor is disposed on the shaft between the bearings and inside the stator.

In another aspect of the technology, a pair of collars are attached to the shaft, each located between the rotor and a corresponding bearing. Each collar includes a cylindrical flinger portion adjacent its corresponding bearing. The cylindrical flinger portion includes a plurality of radial drain holes, or notches, such that oil entering a recessed region of the cylindrical flinger portion from the bearing is projected, or flung, radially outward through the drain holes where it drains away from the collar. Each collar includes a spacer portion opposite the cylindrical flinger portion and a piston ring located between the spacer portion and cylindrical flinger portion.

In yet other aspects of the technology, the spacer portion has an axially facing locating surface, or face, that abuts the rotor and the cylindrical flinger portion has an axially facing surface that abuts a corresponding axial face of the bearing, thereby axially locating the rotor and shaft relative to the bearings. The spacer portion includes an axially facing flinger surface that confronts an inner surface of a corresponding end cavity, wherein the flinger surface is operative to direct oil migrating past the piston ring to travel along the inner surface of the end cavity where it is then drained away from the stator.

Accordingly, the collars provide primary, secondary, and tertiary oil migration control structures to inhibit the migration of oil into the gap between the rotor and stator. Primary oil control is provided by the cylindrical flinger portion. The cylindrical flinger portion directs oil away from the piston ring and toward various oil outlet passages formed in the housing. Secondary oil control is provided by the piston ring. Any oil that migrates past the cylindrical flinger portion is inhibited from migrating further by the piston ring seal. Finally, tertiary oil migration control is provided by the axially facing flinger surface of the spacer portion. Any oil that migrates past the piston ring is flung off of the collar and directed along an inner surface of the end cavity and allowed to drain through one of various oil outlet passages formed in the housing.

These and other aspects of the electrically assisted turbocharger will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

DRAWINGS

Non-limiting and non-exhaustive embodiments of the electrically assisted turbocharger, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense. It should be understood that not all of the components of a turbocharger are shown in the figures and that the present disclosure contemplates the use of various turbocharger components as are known in the art. Turbocharger construction is well understood in the art and a full description of every component of a turbocharger is not necessary to understand the technology of the present application, which is fully described and disclosed herein.

Figure 1:
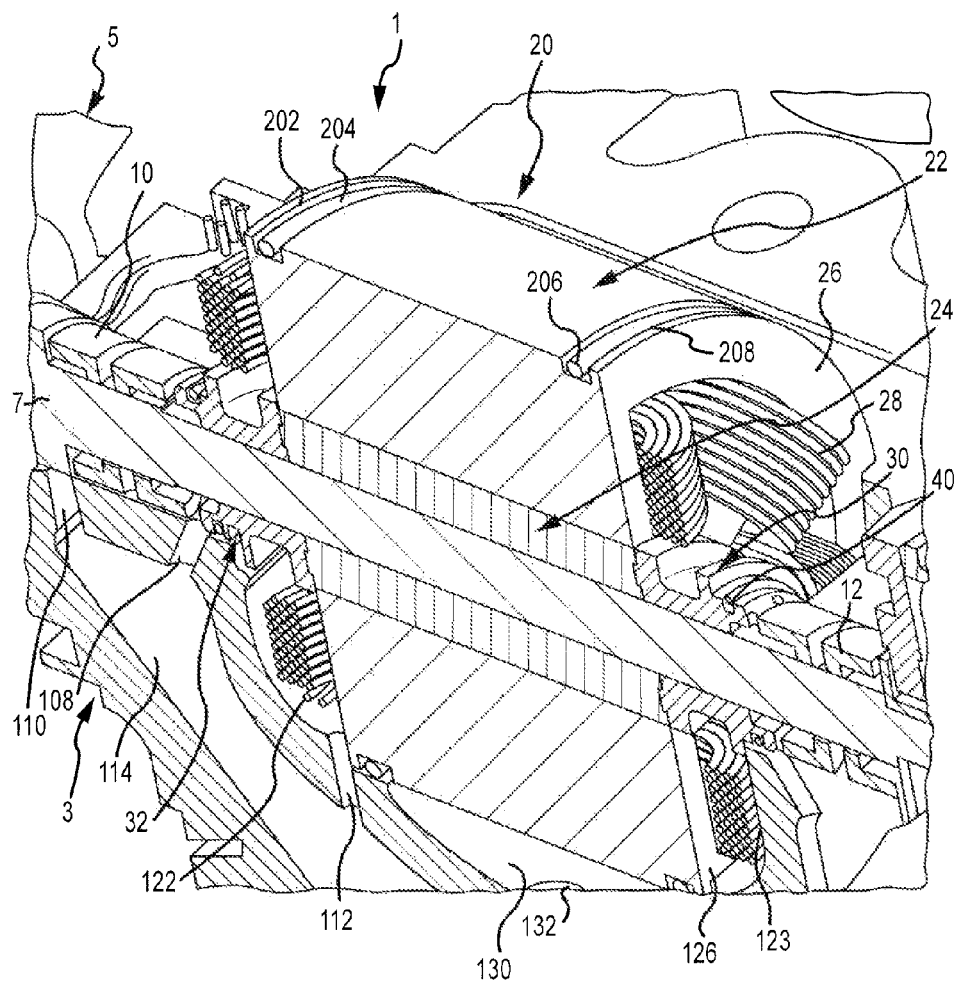
FIG. 1 is a partial cross-sectional perspective view of an electrically assisted turbocharger according to an exemplary embodiment.

The electrically assisted turbocharger 1, shown in FIG. 1, includes a housing 3 and an electric motor 20 disposed in the housing. Electric motor 20 includes a stator 22 and a rotor 24 disposed on shaft 7. Stator 22 includes an armature 26 that supports a plurality of coil windings 28 as is known in the art. In the case of a permanent magnet motor, rotor 24 may include a plurality of permanent magnets. Other types of motors may be used, such as for example a switched reluctance motor. Electric motor 20 is connected via suitable conductive connections to the appropriate controls and power source as are well understood in the art.

Stator armature 26 includes a pair of circumferential grooves 202 and 206 in which are disposed a pair of O-rings 204 and 208, respectively. O-rings 204 and 208 are operative to seal against an interior wall of housing 3, thereby forming an annular chamber 130 that extends around at least a portion of stator 22. Annular chamber 130 is adapted to circulate cooling fluid, such as oil, around the stator 22. Oil may be circulated in annular chamber 130 via port 132. As can be appreciated from the figure, a pair of end cavities 122 and 126 are created on either end of the stator 22. Thus, the interior of housing 3 is divided into at least three chambers: annular chamber 130 and two end cavities 122 and 126. While annular chamber 130 is flooded with cooling oil, the end cavities 122 and 126 are intended to remain free of oil. End cavities 122, 126 are sealed on one side by a corresponding one of the o-rings 204, 208 and sealed on the other side by a corresponding collar 32, 30, described more fully below.

Shaft 7 is supported in housing 3 by journal bearings 10 and 12 that are disposed in the housing 3 on each side of the rotor 24. Disposed on shaft 7 is a turbine wheel 5 and a compressor wheel (not shown) that comprise the working portions of the turbocharger, as known in the art. Collars 30 and 32 are attached to shaft 7 on either side of the rotor 24 and are disposed between the rotor and a corresponding bearing 12 and 10, respectively. Collars 30 and 32 are operative to axially locate the rotor as well as provide primary, secondary, and tertiary sealing structures to prevent oil from migrating into the gap between the rotor 24 and stator 22. Collars 30 and 32 may be pressed onto shaft 7 thereby capturing and locating rotor 24 on the shaft.

Figure 2:
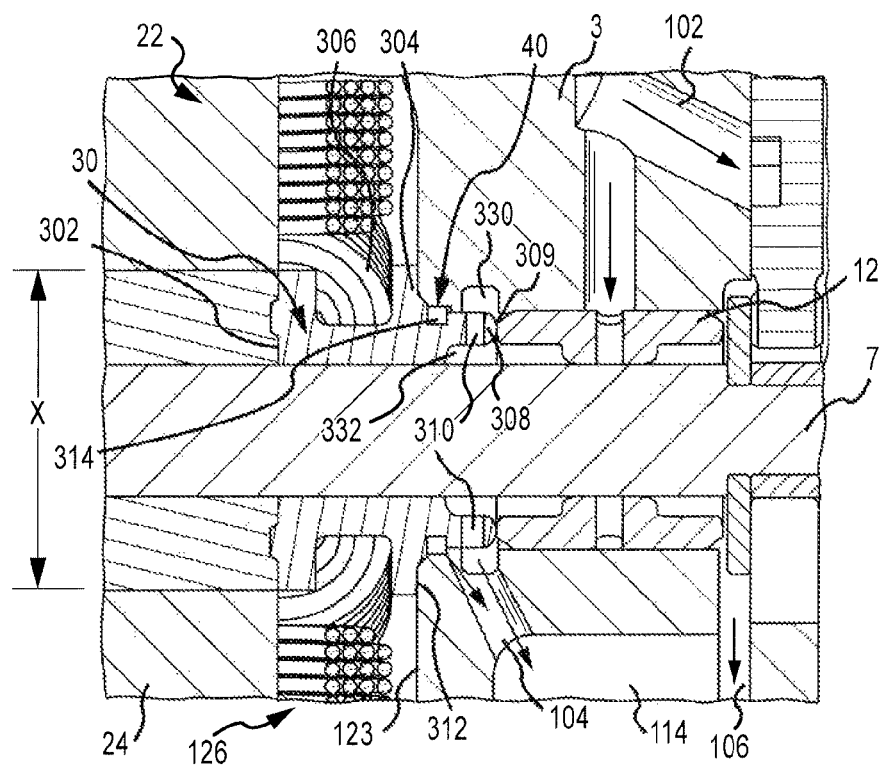
FIG. 2 is an enlarged partial cross-sectional perspective view of the compressor end bearing and collar arrangement shown in FIG. 1.

With reference to FIG. 2, it can be appreciated that the compressor end collar 30 includes a spacer portion 304 and a cylindrical flinger portion 308 extending therefrom. As in this case, spacer portion 304 may be machined with features, such as groove 306, to reduce the rotating mass of the collar. However, it should be understood that the groove may be omitted or the groove may have a different cross-section than that shown in the figures. Also, material in this area may be removed from one or both of the collars 30, 32 as necessary to dynamically balance the shaft and rotor assembly. The outside diameter of the compressor end collar 30, in this case spacer portion 304, is sized such that it fits through the inner diameter X of stator 22 in order to facilitate assembly of the turbocharger. Collars 30 and 32 may be comprised of any suitable material such as aluminum, steel, titanium, or the like.

Spacer portion 304 includes an axially-facing locating surface, or face, 302 that abuts rotor 24. Cylindrical flinger portion 308 has an axially-facing surface 309 that confronts a corresponding axially-facing surface on bearing 12. Accordingly, collar 30 and, in a similar fashion, collar 32 are operative to locate rotor 24 and shaft 7 with respect to bearings 10 and 12.

Cylindrical flinger portion 308 includes a plurality of radial drain holes 310 intersecting with a recessed region 332. A piston ring groove 314 is formed around a circumference of collar 30 between cylindrical flinger portion 308 and spacer portion 304. Piston ring 40 is disposed in groove 314 and is operative to provide a seal between housing 3 and collar 30. Spacer portion 304 includes an axially-facing flinger surface 312. Flinger surface 312 extends into end cavity 126 and cooperates with end cavity surface 123 to move oil away from the rotor 24.

Journal bearings 10 and 12 are fed with oil via oil feed passages, such as oil feed passage 102, shown in FIG. 2. Oil fed to journal bearing 10 is substantially the same as the oil fed to journal bearing 12 and only journal bearing 12 is described herein. In this case, oil fed to bearing 12 drains via oil drain passages 104 and 106 that both empty into a common oil plenum 114. Collar 30 includes a primary, or first, oil control structure in the form of the cylindrical flinger portion 308. Oil draining from bearing 12 toward collar 30 enters recessed region 332 and is flung through holes 310, via centrifugal force, towards an annular groove 330 formed in housing 3 and aligned with drain holes 310. Drain passage 104 intersects with annular groove 330 whereby oil flung into groove 330 may drain through passage 104 into the common oil plenum 114. In this way, cylindrical flinger portion 308 directs oil away from the piston ring 40.

Piston ring 40 acts as a secondary, or second, seal structure that inhibits any oil that is able to migrate past the cylindrical flinger portion 308 from migrating further along the leak path towards the rotor and stator. Piston ring 40 may be a standard piston ring seal as are known in the art and may be comprised of steel, for example. Piston ring 40 provides a seal between housing 3 and collar 30 as shown in the figures.

However, if any oil is able to migrate past piston ring 40, the axially-facing flinger surface 312 of spacer portion 304 acts as a tertiary, or third, seal and flings the remaining oil radially along inner surface 123 of end cavity 126. Oil directed along surface 123 then drains into the oil plenum 114 via another oil drain passage, similar to the oil drain passage 112 associated with end cavity 122, which is explained further below with reference to FIG. 3.

Figure 3:
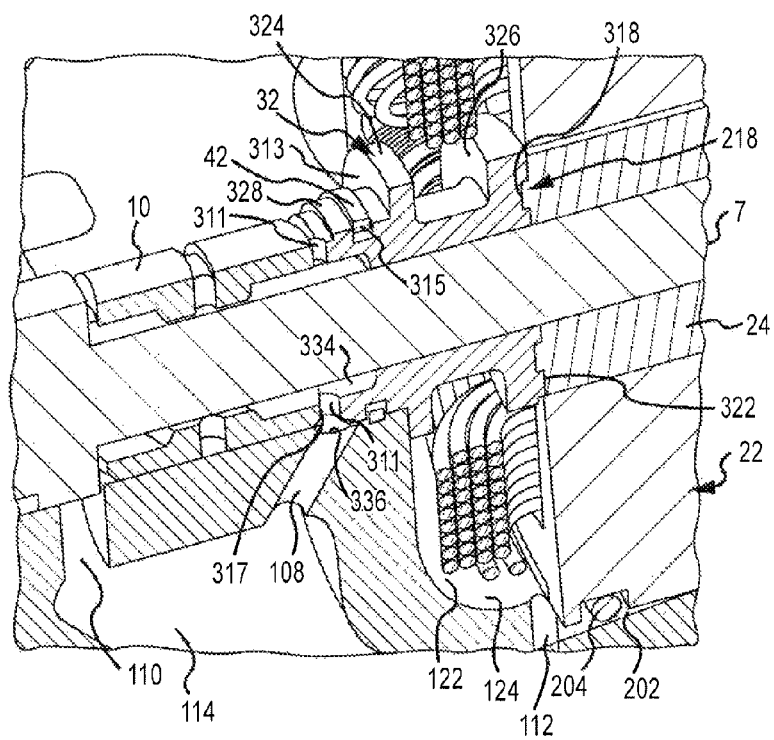
FIG. 3 is an enlarged partial cross-sectional perspective view of the turbine end bearing and collar arrangement shown in FIG. 1.

The collar and bearing arrangement of the turbine end, shown in FIG. 3, is similar to that of the compressor end. The turbine end includes bearing 10 which supports shaft 7 adjacent the turbine wheel 5. Collar 32 is disposed between bearing 10 and rotor 24. It is contemplated that identical collars could be used on both the compressor and turbine ends of a turbocharger. In this case, however, there are differences between collars 30 and 32 as explained below.

Collar 32 includes a cylindrical flinger portion 328 similar to that of collar 30. In this case, rather than drain holes, collar 32 includes a plurality of drain notches 311. Opposite the cylindrical flinger portion 328 is the spacer portion 324 with optional groove 326 formed therearound. Locating surface 322 abuts rotor 24, and an oppositely-facing axial surface 317 abuts the bearing 10, thereby locating the rotor 24 and shaft 7. Collar 32 includes piston ring groove 315 and piston ring 42. Spacer portion 324 also includes an axially-facing flinger surface 313 which confronts inner surface 124 of end cavity 122.

As with the compressor end collar 30, the turbine side collar 32 includes primary, secondary, and tertiary sealing structures. Specifically, the cylindrical flinger portion 328 ejects, or flings, oil entering recessed region 334 via drain notches 311 into groove 336. Groove 336 drains into oil drain passage 108 and into oil plenum 114. Any oil migrating past the cylindrical flinger portion 328 is prevented from migrating further by piston ring 42. However, in the event any oil is able to migrate past piston ring 42, the flinger surface 313 propels the oil under centrifugal force along surface 124 of end cavity 122. Oil draining along inner surface 124 is drained through oil passage 112 into common oil plenum 114.

Collars 30 and 32 may include cooperative indexing features to prevent the rotor 24 from rotating with respect to shaft 7 and collars 30, 32. For example, collar 32 includes one or more slots 318 formed in locating surface 322 that mate with corresponding protrusions 218 projecting from rotor 24. Accordingly, when collars 30 and 32 are pressed onto shaft 7 on either side of rotor 24, at least one of the collars engages the rotor in order to prevent rotation of the rotor 24 relative to shaft 7. In this case, the slots are shown in collar 32; however, as an alternative, the slots may be formed in the rotor and the protrusions included on the collar.

End cavities 122 and 126 may be provided with a positive pressure source in order to further inhibit oil migration into the end cavities. Suitable pressure sources include, for example and without limitation, truck air, turbine inlet/waste gate pressure, or compressed gas from a separate turbo stage. It is further contemplated that end cavities 122 and 126 may be supplied with air to provide additional cooling to the stator.

Accordingly, the electrically assisted turbocharger has been described with some degree of particularity directed to the exemplary embodiments. It should be appreciated, though, that modifications or changes may be made to the exemplary embodiments without departing from the inventive concepts contained herein.

The invention claimed is:

1. An electrically assisted turbocharger (1), comprising:
   a housing (3);
   an electric motor stator (22) disposed in the housing (3);
   a pair of bearings (10, 12) disposed in the housing (3), one on each side of the stator (22);
   a shaft (7) supported in the housing (3) by the bearings (10, 12);
   a turbine wheel (5) and a compressor wheel supported on the shaft (7);
   an electric motor rotor (24) disposed on the shaft (7) between the bearings (10, 12) and inside the stator (22); and
   a pair of collars (30, 32) attached to the shaft (7), each located between the rotor (24) and a corresponding bearing (10, 12), wherein at least one collar (30, 32) includes a cylindrical flinger portion (308) adjacent its corresponding bearing (10, 12), a spacer portion (304) opposite the cylindrical flinger portion (308), and a ring seal (40) located between the spacer portion (304) and the cylindrical flinger portion (308).

2. The turbocharger (1) according to claim 1, further comprising a pair of circumferential seals (204, 208) disposed on the stator (22) and operative to seal against an interior of the housing (3) to form an annular chamber (130) around at least a portion of the stator (22) and a pair of end cavities (122, 126) located at axial ends of the stator (22), wherein the annular chamber (130) is adapted to facilitate circulation of a cooling fluid around the stator (22).

3. The turbocharger (1) according to claim 1, wherein the cylindrical flinger portion (308) includes a plurality of radial drains (310), such that oil entering a recessed region (332) of the cylindrical flinger portion (308) from the bearing (10, 12) is projected radially outward through the drains (310).

4. The turbocharger (1) according to claim 1, wherein the spacer portion (304) includes an axially facing locating surface (302) adapted to abut the rotor (24), and wherein the cylindrical flinger portion (308) includes an axially facing surface (309) adapted to abut a corresponding axial face of the bearing (10, 12), thereby axially locating the rotor (24) and shaft (7) relative to the bearings (10, 12).

5. The turbocharger (1) according to claim 4, wherein the spacer portion (304) includes an axially facing flinger surface (312) confronting an inner surface (123) of a corresponding end cavity (122, 126), wherein the flinger surface (312) is operative to direct oil migrating past the ring seal (40) to travel along the inner surface (123) of the end cavity (122, 126).

6. An electrically assisted turbocharger (1), comprising:
   a housing (3);
   an electric motor stator (22) disposed in the housing (3);
   a pair of bearings (10, 12) disposed in the housing (3), one on each side of the stator (22);
   a shaft (7) supported in the housing (3) by the bearings (10, 12);
   a turbine wheel (5) and a compressor wheel supported on the shaft (7);
   an electric motor rotor (24) disposed on the shaft (7) between the bearings (10, 12) and inside the stator (22);
   a pair of collars (30, 32) attached to the shaft (7), each located between the rotor (24) and a corresponding bearing (10, 12), wherein at least one collar (30, 32) includes:
      a cylindrical flinger portion (308) adjacent its corresponding bearing (10, 12), the cylindrical flinger portion (308) including a plurality of radial drains (310), such that oil entering a recessed region (332) of the cylindrical flinger portion (308) is projected radially outward through the drains (310); and
      a spacer portion (304) opposite the cylindrical flinger portion (308); and
   a seal (40) located between the spacer portion (304) and the cylindrical flinger portion (308).

7. The turbocharger (1) according to claim 6, wherein the spacer portion (304) includes an axially facing locating surface (302) adapted to abut the rotor (24), and wherein the cylindrical flinger portion (308) includes an axially facing surface (309) adapted to abut a corresponding axial face of the bearing (10, 12), thereby axially locating the rotor (24) and shaft (7) relative to the bearings (10, 12).

8. The turbocharger (1) according to claim 7, wherein the spacer portion (304) includes an axially facing flinger surface (312) confronting an inner surface (123) of a corresponding end cavity (122, 126), wherein the flinger surface (312) is operative to direct oil migrating past the seal (40) to travel along the inner surface (123) of the end cavity (122, 126).

9. The turbocharger (1) according to claim 6, further comprising a pair of circumferential seals (204, 208) disposed on the stator (22) and operative to seal against an interior of the housing (3) to form an annular chamber (130) around at least a portion of the stator (22), wherein the annular chamber (130) is adapted to facilitate circulation of a cooling fluid around the stator (22).

10. An electrically assisted turbocharger (1), comprising:
a housing (3);
an electric motor stator (22) disposed in the housing (3);
a pair of circumferential seals (204, 208) disposed on the stator (22) and operative to seal against an interior of the housing (3) to form an annular chamber (130) around at least a portion of the stator (22) and a pair of end cavities (122, 126) located at axial ends of the stator (22);
a pair of bearings (10, 12) disposed in the housing (3), one on each side of the stator (22);
a shaft (7) supported in the housing (3) by the bearings (10, 12);
a turbine wheel (5) and a compressor wheel supported on the shaft (7);
an electric motor rotor (24) disposed on the shaft (7) between the bearings (10, 12) and inside the stator (22); and
a pair of collars (30, 32) attached to the shaft (7), each located between the rotor (24) and a corresponding bearing (10, 12), wherein at least one collar (30, 32) includes:
a cylindrical flinger portion (308) adjacent a corresponding bearing (10, 12), including:
a plurality of radial drains (310), such that oil entering a recessed region (332) of the cylindrical flinger portion (308) from the bearing (10, 12) is projected radially outward through the drains (310); and
an axially facing surface (309) adapted to abut a corresponding axial face of the bearing (10, 12), thereby axially locating the rotor (24) and shaft (7) relative to the bearings (10, 12); and
a spacer portion (304) opposite the cylindrical flinger portion (308) including an axially facing locating surface (302) adapted to abut the rotor (24); and
a piston ring (40) located between the spacer portion (304) and the cylindrical flinger portion (308).

11. The turbocharger (1) according to claim 10, wherein the annular chamber (130) is adapted to facilitate circulation of a cooling fluid around the stator (22).

12. The turbocharger (1) according to claim 10, wherein the circumferential seals (204, 208) comprise o-rings.

13. The turbocharger (1) according to claim 10, wherein the spacer portion (304) includes an axially facing flinger surface (312) confronting an inner surface (123) of a corresponding end cavity (122, 126), wherein the flinger surface (312) is operative to direct oil migrating past the piston ring (40) to travel along the inner surface (123) of the end cavity (122, 126).

* * * * *